US009839233B2

(12) United States Patent
Hardin, Jr.

(10) Patent No.: US 9,839,233 B2
(45) Date of Patent: Dec. 12, 2017

(54) JUICE EXTRACTOR WITH CLEANING FEATURE

(71) Applicant: Sunbeam Products, Inc., Boca Raton, FL (US)

(72) Inventor: George T. Hardin, Jr., Hattiesburg, MS (US)

(73) Assignee: Sunbeam Products, Inc., Boca Raton, FL (US)

( * ) Notice: Subject to any disclaimer, the term of this patent is extended or adjusted under 35 U.S.C. 154(b) by 307 days.

(21) Appl. No.: 14/657,579

(22) Filed: Mar. 13, 2015

(65) Prior Publication Data

US 2015/0257434 A1 Sep. 17, 2015

Related U.S. Application Data

(60) Provisional application No. 61/952,421, filed on Mar. 13, 2014.

(51) Int. Cl.
| | |
|---|---|
| *A23N 1/00* | (2006.01) |
| *A23N 1/02* | (2006.01) |
| *B30B 9/12* | (2006.01) |
| *A47J 19/02* | (2006.01) |
| *A47J 31/60* | (2006.01) |

(52) U.S. Cl.
CPC ............. *A23N 1/02* (2013.01); *A47J 19/027* (2013.01); *A23N 1/00* (2013.01); *A47J 19/025* (2013.01); *A47J 31/60* (2013.01); *B30B 9/12* (2013.01)

(58) Field of Classification Search
CPC .. A23N 1/02; A23N 1/00; A47J 19/027; A47J 19/025; B30B 9/12

USPC .................................................. 99/510–513
See application file for complete search history.

(56) References Cited

U.S. PATENT DOCUMENTS

| | | | | | |
|---|---|---|---|---|---|
| 4,506,601 | A | * | 3/1985 | Ramirez | A47J 19/027 99/511 |
| 5,222,430 | A | * | 6/1993 | Wang | A47J 19/027 241/282.1 |
| 5,355,784 | A | * | 10/1994 | Franklin | A47J 19/027 241/199.12 |
| 5,421,248 | A | * | 6/1995 | Hsu | A47J 19/027 241/282.1 |

(Continued)

OTHER PUBLICATIONS

Rotor Clip, Wave Springs, Dec. 30, 2010, all pages.*

*Primary Examiner* — Arthur O Hall
*Assistant Examiner* — Joseph A Greenlund
(74) *Attorney, Agent, or Firm* — Seth Blum

(57) ABSTRACT

A food preparation appliance including a housing containing a sieve having an inner perforated surface for extracting fruits and vegetables into liquids and solid particles, a source of rotatable power for rotating the sieve, and a manually operated cleaning device for removing pulp of food particles from the perforated surface of the sieve. The cleaning device includes a cleaning implement having a first position normally biased into a non-engaged position from the perforated surface and a second position when the cleaning device is operated to an engaged position against the perforated surface. The cleaning implement is biased against the perforated surface in the second position using a biasing member configured to maintain constant engagement of the cleaning implement against the perforated surface while the sieve is rotated. In an embodiment, the biasing member is a coil wave spring.

16 Claims, 7 Drawing Sheets

(56) References Cited

U.S. PATENT DOCUMENTS

| | | | | |
|---|---|---|---|---|
| 5,433,144 | A * | 7/1995 | Lee | A47J 43/046 |
| | | | | 99/511 |
| 5,495,795 | A | 3/1996 | Harrison et al. | |
| 5,669,292 | A * | 9/1997 | Chen | A47J 19/027 |
| | | | | 99/511 |
| 6,298,776 | B1 * | 10/2001 | Ekstrom | A47J 43/0716 |
| | | | | 241/101.1 |
| 6,813,997 | B1 * | 11/2004 | Lin | A47J 19/027 |
| | | | | 99/492 |
| 7,044,051 | B2 * | 5/2006 | Le Rouzic | A47J 43/0716 |
| | | | | 99/511 |
| 8,091,473 | B2 | 1/2012 | Kim | |
| 8,146,490 | B2 * | 4/2012 | Obersteiner | A47J 19/027 |
| | | | | 241/273.2 |
| 8,978,548 | B2 * | 3/2015 | Pucher | A47J 19/027 |
| | | | | 99/486 |
| 2006/0117960 | A1 * | 6/2006 | Fischer | A47J 31/3614 |
| | | | | 99/279 |
| 2015/0257434 | A1 * | 9/2015 | Hardin, Jr. | A23N 1/02 |
| | | | | 99/511 |

\* cited by examiner

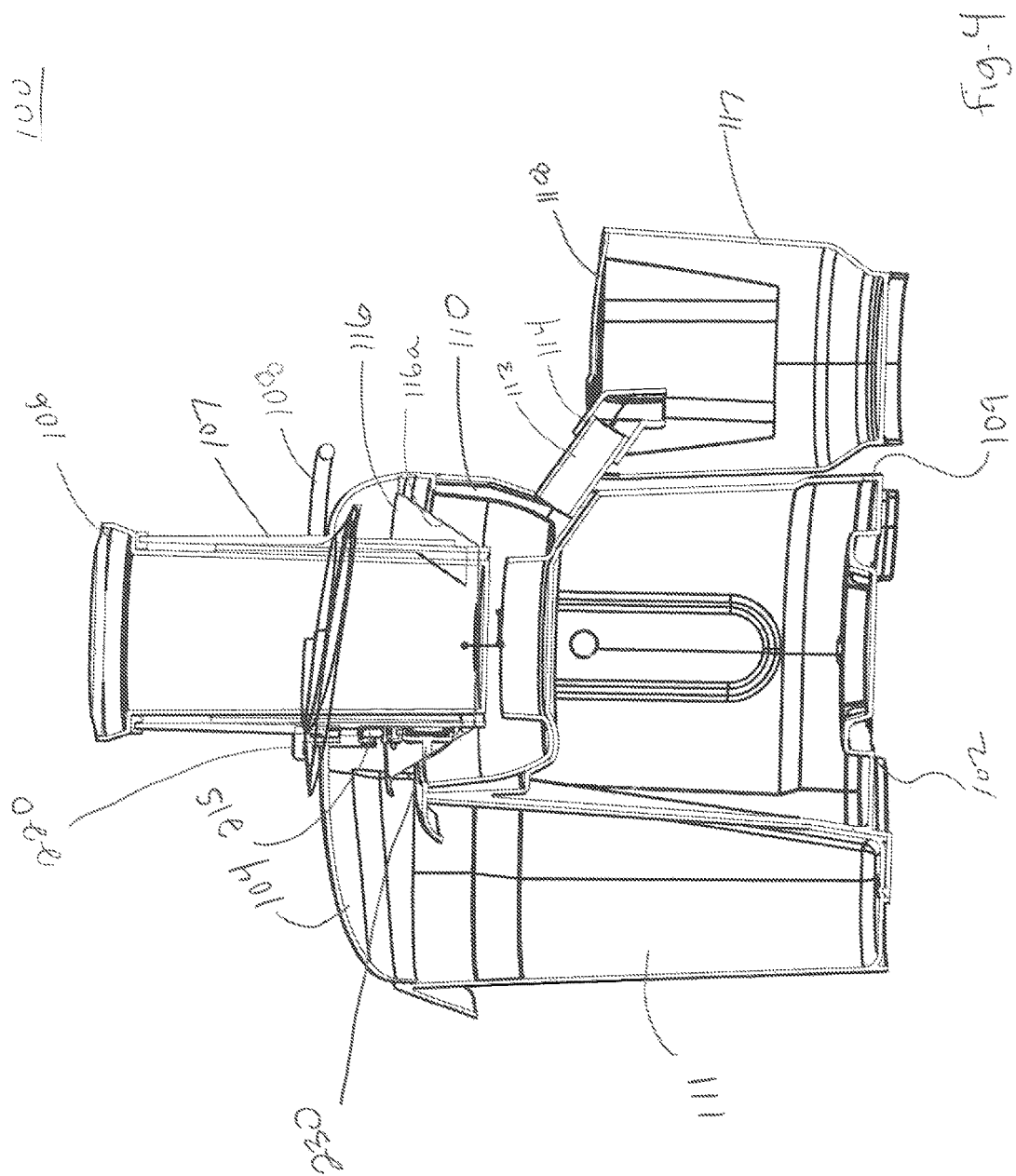

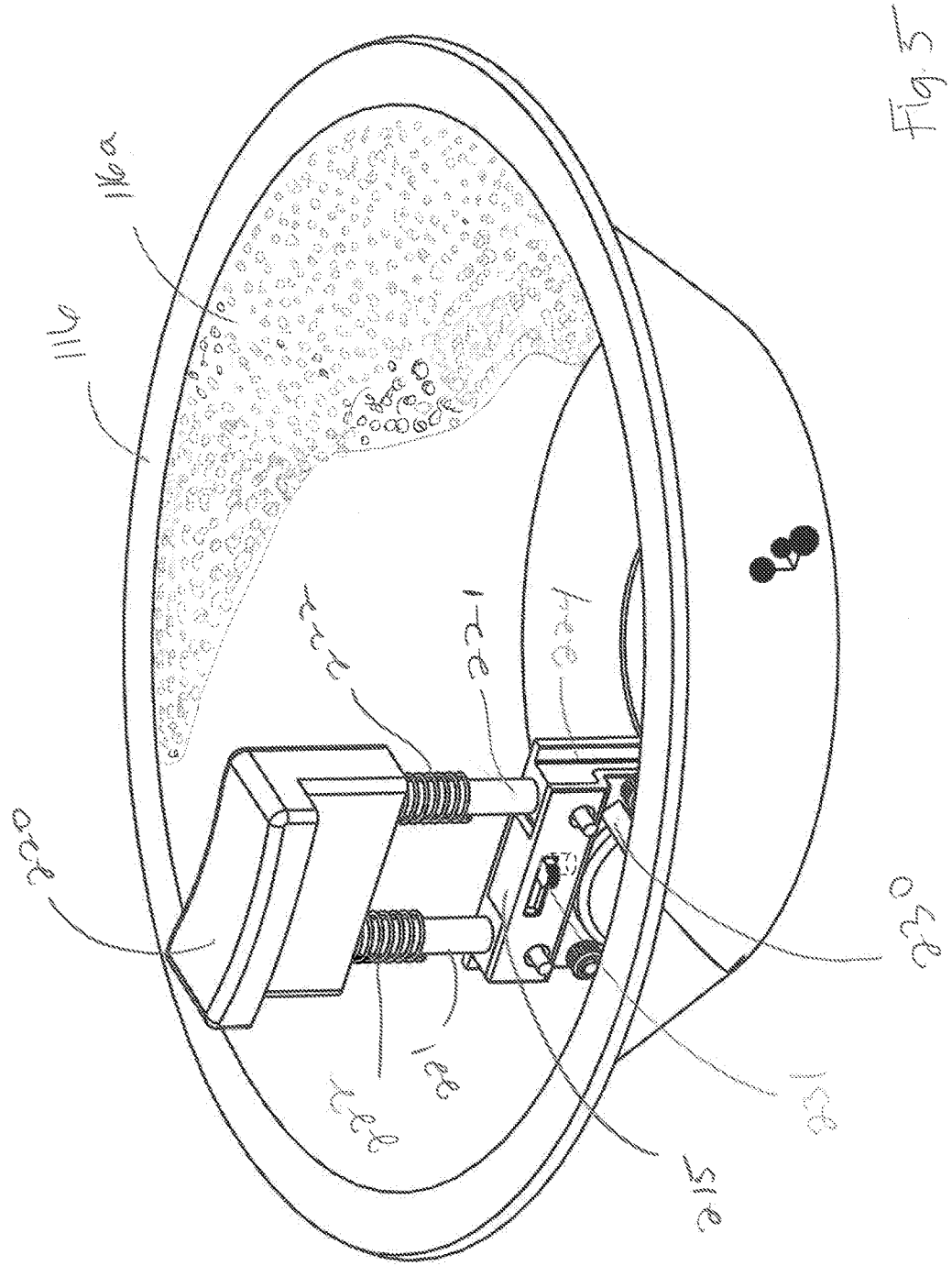

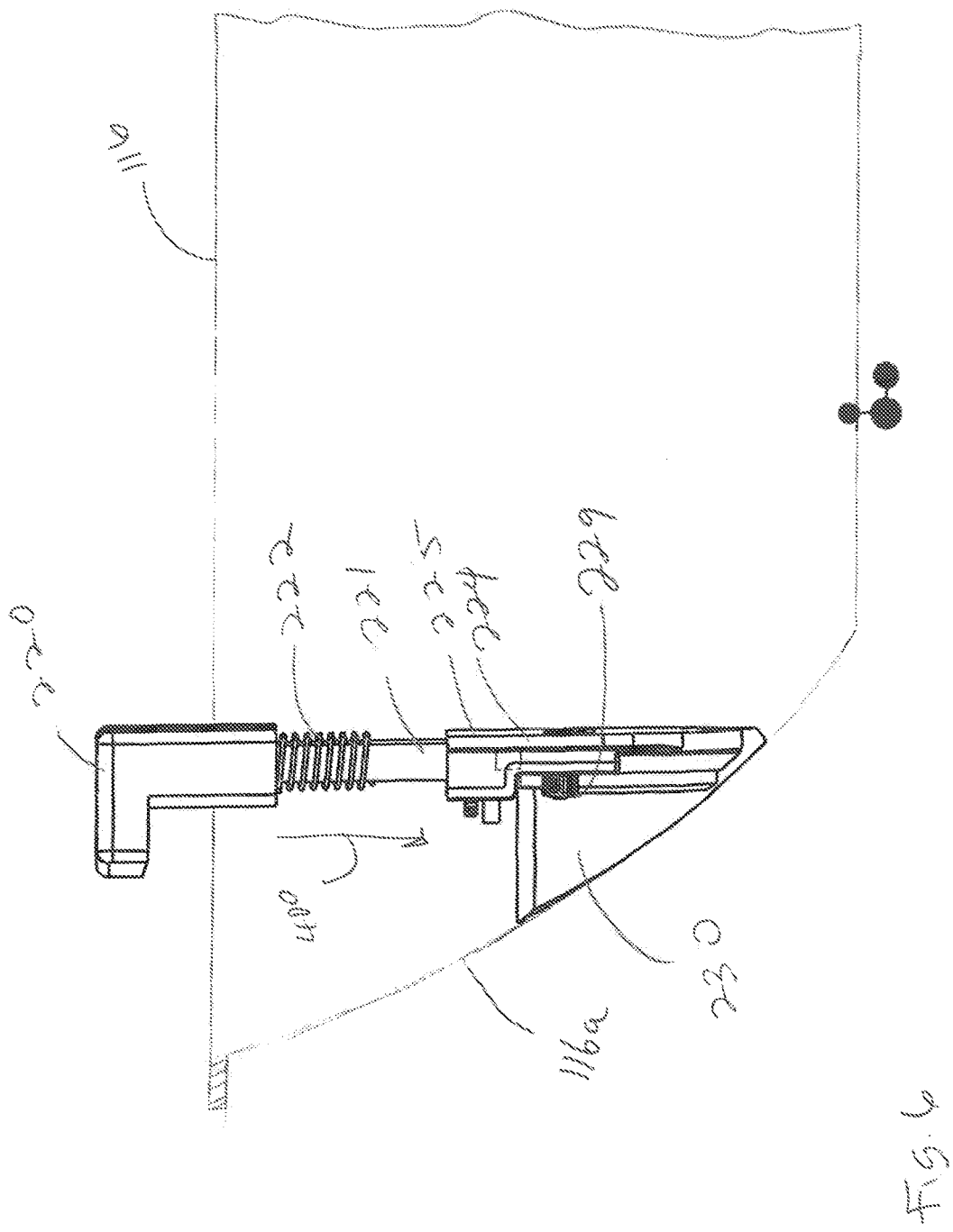

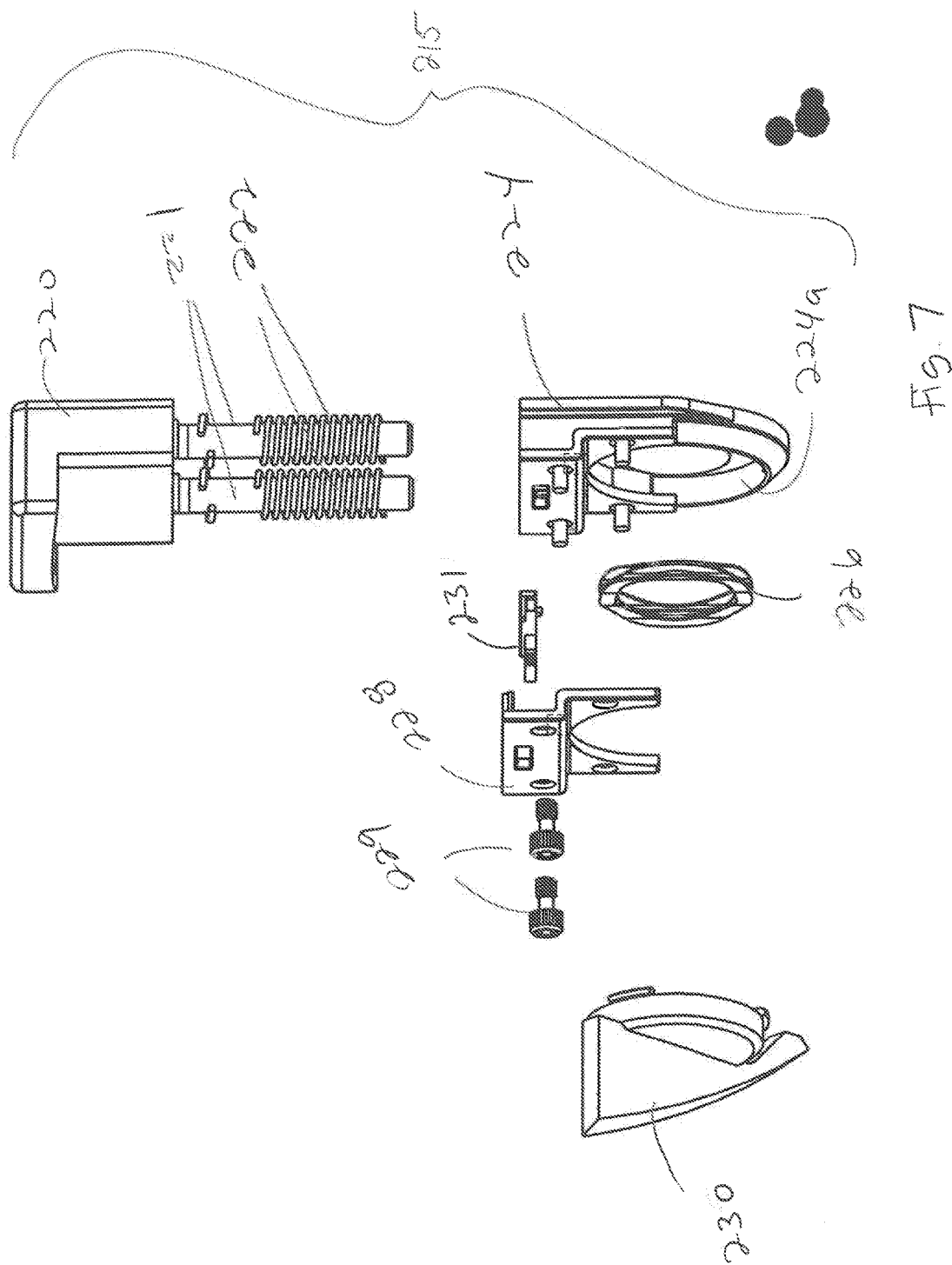

JUICE EXTRACTOR WITH CLEANING FEATURE

CROSS-REFERENCE TO RELATED APPLICATION

The present application claims benefit of U.S. Provisional Patent Application No. 61/952,421 filed Mar. 13, 2014, entitled "Juice Extractor Cleaning Feature".

FIELD OF THE INVENTION

The invention relates to food preparation appliances. More particularly, the invention relates to an improved food preparation appliance with a cleaning feature for removing excessive buildup of pulp from a rotating sieve that shreds fruits and vegetables and extracts juice for consumption.

BACKGROUND OF THE INVENTION

Appliances for preparing food are well known, and in particular, juicing appliances for preparing juice from fruits and vegetables. Typically, these appliance use a shredding implement such as a perforated disc to shred the fruits and vegetables and a filter screen to extract liquid from the solid food particles. An unfortunate consequence of shredding fruits and vegetables with such a shredding implement is that unwanted pulp builds up on the working surface of the shredding implement. This unwanted buildup of pulp needs to be periodically removed or the juicing efficiency is seriously reduced. Many of these juicing appliances use a cleaning implement to periodically scrape the pulp from the shredding implement. One drawback of these cleaning implements is that irregularities on the working surface of the shredding implement cause the cleaning implement to be unevenly applied against the surface of the shredding implement as it is rotated reducing cleaning efficiency.

SUMMARY OF THE INVENTION

In an embodiment, there is provided a food preparation appliance including a housing containing a sieve having an inner perforated surface for extracting a food item into liquid and solid particles, a source of rotatable power for rotating the sieve, and a manually operated cleaning device for removing unwanted buildup of pulp from the perforated surface of the sieve. The cleaning device includes a cleaning implement having a first position normally biased into a non-engaged position from the perforated surface and a second position when the cleaning device is operated to an engaged position against the perforated surface. The cleaning implement is biased against the perforated surface in the second position using a biasing member configured to maintain constant engagement of the cleaning implement against the perforated surface while the sieve is rotated.

In an embodiment, there is provided a juicing appliance including a housing, a sieve disposed within the housing having an inner perforated surface for extracting liquid and solid particles from a food item, a source of rotatable power for rotating the sieve, a manually operated cleaning device for removing unwanted buildup of pulp from the perforated surface of the sieve. The cleaning device is a wiper blade having a first position normally biased into a non-engaged position from the perforated surface and a second position when the cleaning device is operated to an engaged position against the perforated surface. The wiper blade is biased against the perforated surface in the second position using a biasing member configured to maintain constant engagement of the cleaning implement against the perforated surface while the sieve is rotated.

In an embodiment, there is provided a juicing appliance including a housing, a sieve disposed within the housing having an inner perforated surface for extracting liquid and solid particles from a food item, a source of rotatable power for rotating the sieve, and a manually operated cleaning device for removing unwanted buildup of pulp from the perforated surface of the sieve. The cleaning device is a wiper blade having a first position normally biased into a non-engaged position from the perforated surface and a second position when the cleaning device is operated to an engaged position against the perforated surface. The cleaning implement is biased against the perforated surface in the second position using a coil wave spring configured to maintain constant engagement of the wiper blade against the perforated surface while the sieve is rotated.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 4 is a cross-sectional side view of the juicing appliance of FIG. 1;

FIG. 5 is a perspective view of the sieve and cleaning feature assembly of the juicing appliance of FIG. 1;

FIG. 6 is a side view of the cleaning feature assembly shown in FIG. 5, shown in an engaged position adjacent an inner perforated surface of the sieve of the juicing appliance of FIG. 1; and FIG. 7 is an exploded view of the cleaning feature assembly shown in FIG. 5.

DETAILED DESCRIPTION OF THE INVENTION

Figure 1:
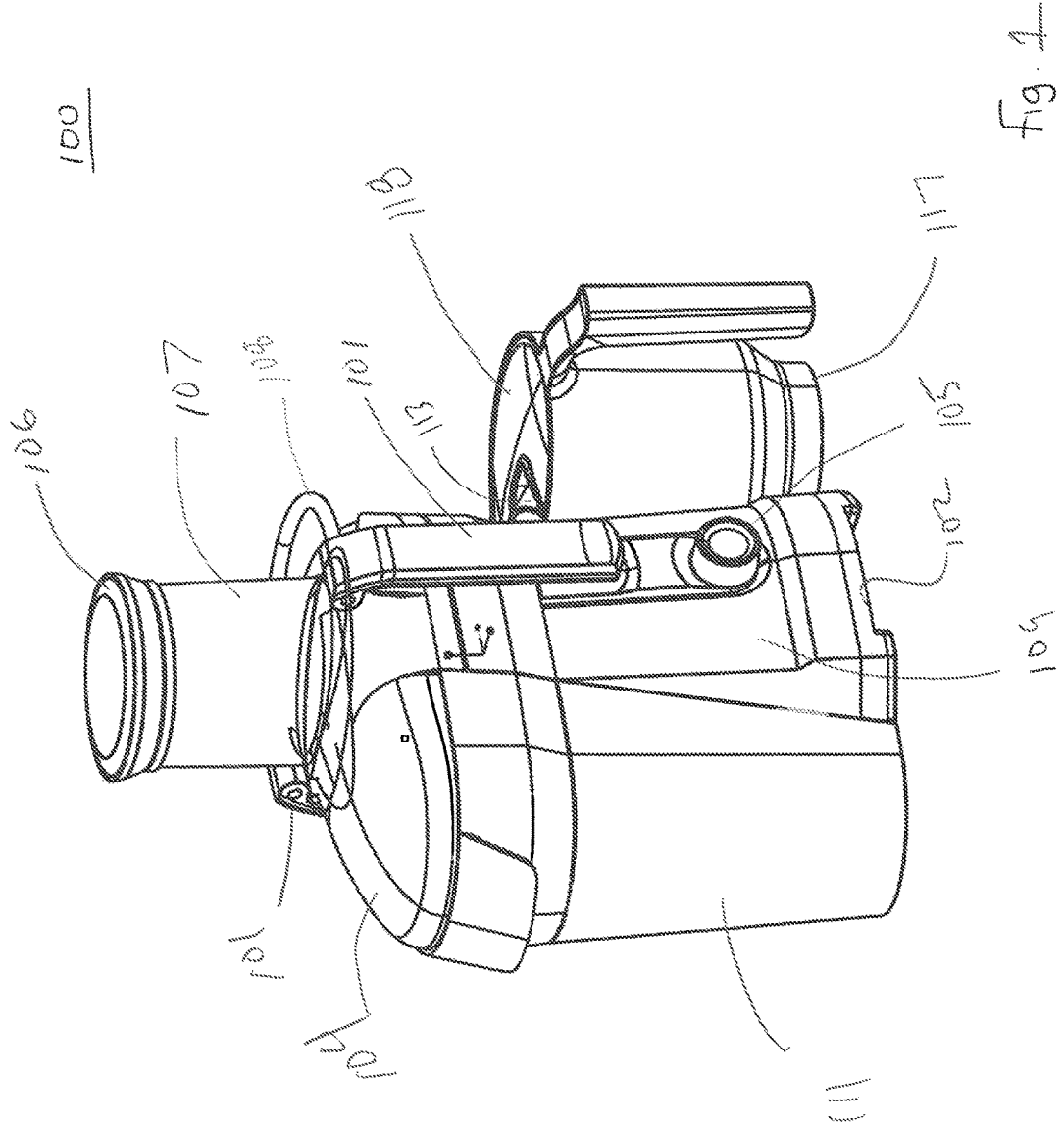
FIG. 1 is a perspective view of a juicing appliance with a cleaning feature.
Figure 2:
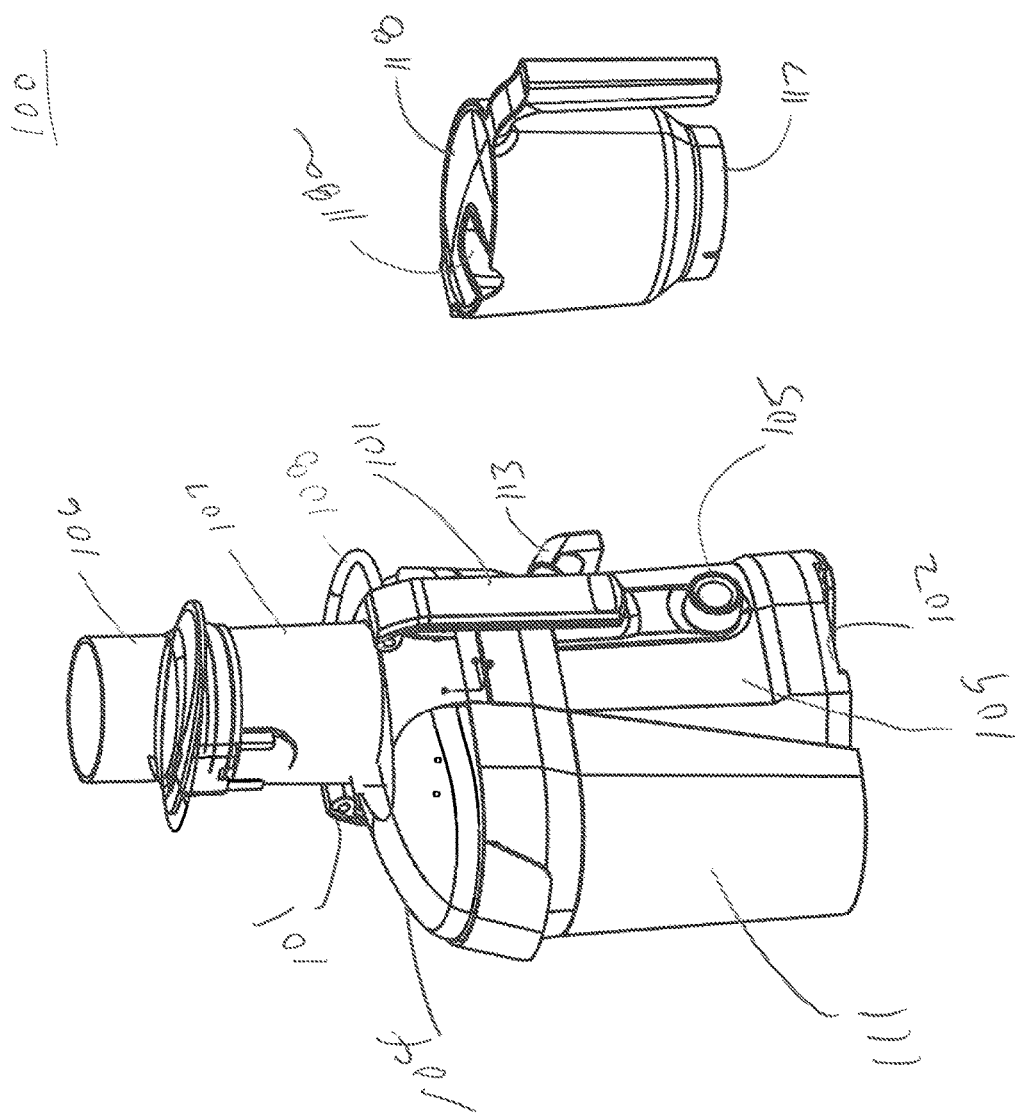
FIG. 2 is another perspective view of the juicing appliance of FIG. 1 with a detachable juice jug removed.

Referring now to FIGS. 1 and 2 of the drawings, in an embodiment there is illustrated a juicing appliance 100 for preparing juice from fruits and vegetables. The juicing appliance 100 includes a base 102, housing 109, lid 104 with a cylindrical feed tube 107 extending upwardly therefrom, pulp container 111 removably attached to the front of the housing 109, a juice jug 117 fitted with a lid 118 removably attached to the rear of the housing 109, and a cylindrical food pusher 106 that is inserted into the feed tube 107. A pair of arms 101 on opposite sides of the housing 109 secure the lid 104 to the housing 109. A control knob 105 disposed on one side of the housing 109 controls the operative electronic components including an electric motor 115 (FIG. 3) disposed within the housing 109. The control knob 105 may include variable settings such as off, low, medium, high, variable speed range, or any other combination speed setting. Alternately, the electric motor 115 may be controlled by a microprocessor (not shown) pre-programmed with juicing routines connected to the control knob 105.

A juice spout 113 extends from the rear of the housing 109 and delivers juice to the juice jug 117 through a cutout 118a and the juice jug lid 118. A pivoting bail 108 is connected to the housing 109 for transporting the juicing appliance 100.

Figure 3:
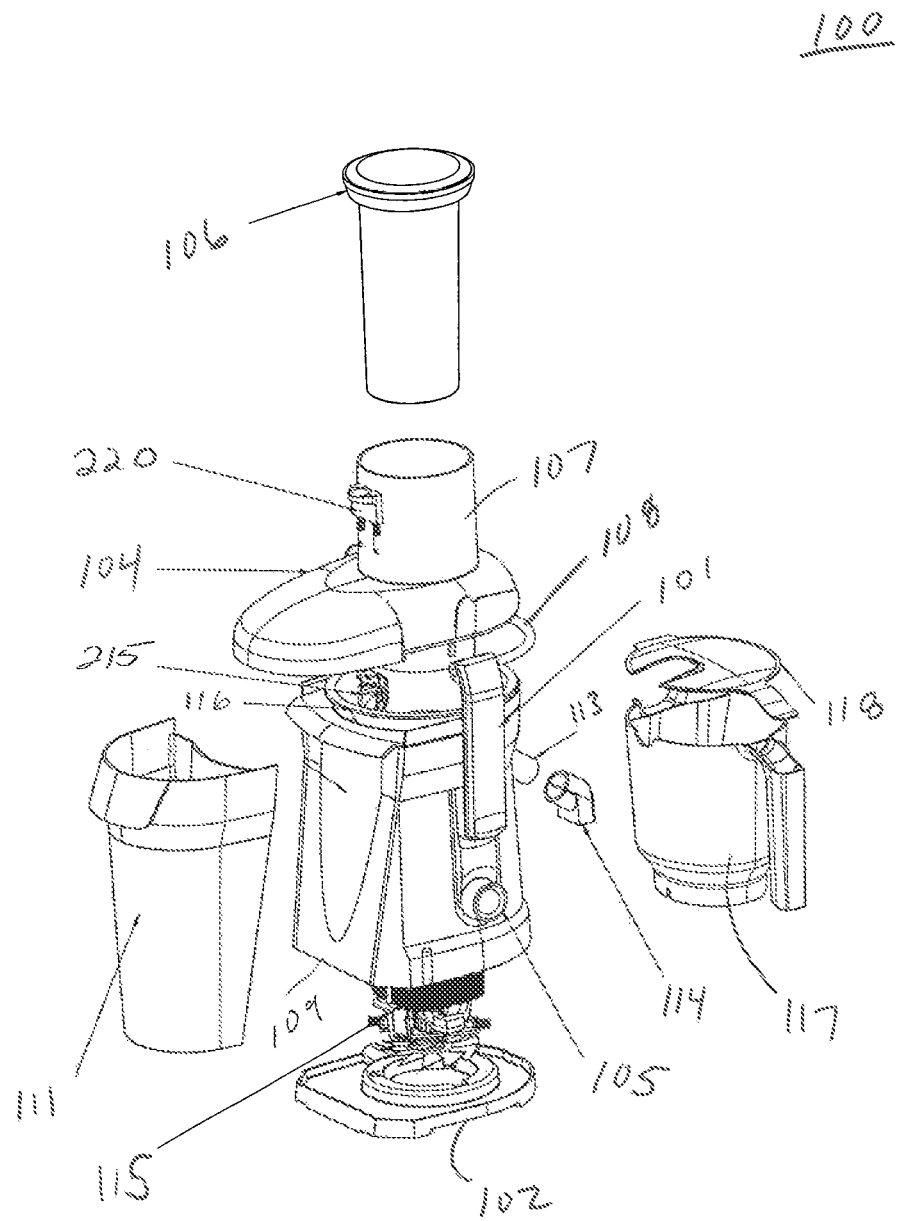
FIG. 3 is a partially exploded perspective view of the juicing appliance of FIG. 1.

Referring now to FIGS. 3 and 4, there are illustrated an exploded view and cross-sectional view of the juicing appliance 100. A frusto-conical shaped sieve 116 is disposed in the housing 109 above an electric motor assembly 115 that is rotatably coupled to the sieve 116. The sieve 116 may be made of any suitable material including but not limited to stainless steel and includes a perforated surface 116a (best seen in FIG. 5) for extracting fruit and vegetables urged against it. The perforated surface 116a is comprised of multiple perforations having sharp edges. When energized with electrical power via the rotating knob 105, the electric motor assembly 115 rotates the sieve 116 about its axis of rotation to urge by centrifugal action the fruits or vegetables fed into the sieve 116 via the feed tube 107 against the perforated surface 116a and perforations. The food pusher 106 is removed and replaced into the feed tube 107 after the fruits and vegetables are fed into the sieve 116. The fruits and vegetables are urged against the perforated surface 116a by centrifugal action as the sieve 116 rotates. The food pusher 106 may be used to improve the extraction process by further urging the fruits and vegetables into the perforated surface 116a of the sieve 116 as it is being rotated.

The sieve 116 in the assembled configuration is inserted into a recess 110 within the housing 109. The recess 110 is fluidly connected to the juice spout 113 that has an open end that drains into the juice jug 117 disposed at the rear of the housing 109. The spout 113 may have an elbow 114 at the free end for directing the juice into the juice jug 117. The elbow is rotatably coupled to the juice spout 113 and when rotated upward acts as a valve preventing juice from flowing out of the juice spout 113. The recess 110 collects juice that drains from within the sieve 116 through the perforated surface 116a as the fruits and vegetables are extracted into liquid and small solid particles. The small solid particles are prevented from entering the recess 110 because they are too large to pass through the perforations in the perforated surface 116a. As the volume of solid particles that are retained in the sieve 116 as the fruits and vegetables are extracted increases to the point they overflow the lip of the sieve 116, the overflow of solid particles are directed by centrifugal action into a pulp container 111 attached to the front of the housing 109. The pulp container 111 may be removed for emptying and cleaning as needed. A cleaning feature 215 is disposed within the housing 109 against the feed tube 106 for removing excess buildup of solid food particles on the perforated surface 116a. The operation of the cleaning feature 215 is described further hereinbelow.

Referring now also to FIGS. 5 and 6, as the sieve 116 is rotated during operation there is a buildup of solid particles within sieve 116 as described above. Fruits and vegetables are extracted as they are urged by centrifugal action against the perforated surface 116a and the unwanted pulp residue begins to build up on the perforated surface 116a reducing juicing efficiency and drainage of juice from the sieve 116 into the recess 110. As a result, this unwanted pulp buildup must be periodically removed from the perforated surface 116a during the juicing operation. In an embodiment, the cleaning feature assembly 215 is provided including a resilient wiper blade 225 that engages the perforated surface 116a as the sieve 116 is rotated to remove the buildup of unwanted pulp from the perforated surface 116a. When it is desired to perform a cleaning operation of the sieve 116, a user depresses a button 220 at the top of the cleaning feature assembly 215. The button 220 is also disposed on the outer side of the lid 104.

When the button 220 is depressed in the direction of arrow 400, a pair of posts 221 extending downwardly from the button 220 urge a wiper blade assembly 225 downward into the sieve 116 and against the perforated surface 116a. Normally, the wiper blade assembly 225 is biased into a retracted position by a pair of springs 222 disposed around the posts 221 and does not contact the perforated surface 116a. A wiper blade 230 is mounted on and extends outwardly from the wiper blade assembly 225 such that when the button 220 is depressed, the outer edge of the wiper blade 230 engages the perforated surface 116a of the sieve 116. The wiper blade 230 disengages the buildup of pulp as the sieve 116 rotates. The wiper blade 230 is set at an optimal angle against the perforated surface 116a for cleaning and removing pulp from the sieve 116. The wiper blade 230 is comprised of a resilient material such as polytetrafluoroethylene, plastic, metal or any other suitable material.

In an embodiment, the wiper blade 230 may automatically be moved into position against the perforated surface 116a at periodic intervals by a solenoid (not shown) controlled by an electronic pushbutton (not shown) or the microprocessor (not shown).

Referring now also to FIG. 7, there is illustrated an embodiment of the cleaning feature assembly 215. The wiper blade 230 is mounted on a mounting assembly 224. The pair of posts 221 fit into apertures (not shown) formed in the top of the mounting assembly 224. The pair of posts 221 are locked and released into the apertures (not shown) by a sliding lock 231 that fits into the mounting assembly 224. An annular coil wave spring 226 is mounted in a recess 224a formed in the mounting assembly 224. A mounting bracket 228 secures the wiper blade 230 against the coil wave spring 226 in the recess 224a. A pair of screws 229 affix the bracket 228 against the mounting assembly 224. The coil wave spring 226 is resilient and biases the wiper blade 230 against the perforated surface 116a but allows the wiper blade 230 to elastically return slightly back into the recess 224a when the wiper blade 230 encounters imperfections in the perforated surface 116a as the sieve 116 rotates. As such, the wave spring 226 causes the wiper blade 230 to apply constant pressure against the perforated surface 116a when the button 220 is depressed despite irregularities in the perforated surface 116a and the imperfections in the roundness of the sieve 116 as the sieve 116 is rotated.

A coil wave spring 226 was selected because of their smaller size in the axial direction as compared to conventional coil springs. In addition, the use of the coil wave spring 226 allows the wiper blade 230 to remain more fully engaged with the perforated surface 116a when irregularities are encountered on the perforated surface 116a as the sieve 116 is rotated. This is because the biasing forces from the coil wave spring 226 are distributed at multiple points on the wiper blade 230 as compared to a being applied at a single point with more conventional coils springs. Still, a conventional coil spring (not shown) may be used although with less effectiveness.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A food preparation appliance, comprising:
a sieve having an inner perforated surface for extracting a food item into liquid and solid particles;
a source of rotatable power for rotating the sieve; and
a manually operated cleaning device for removing unwanted buildup of pulp from the perforated surface of the sieve, the cleaning device is moveable between a first position and a second position and includes a first spring assembly, wherein the first biasing member biases the cleaning device to the first position, a non-engaged position from, the perforated surface, and the cleaning device is manually movable into the second position an engaged position against the perforated surface; and
the cleaning device further including a second biasing member, wherein the second biasing member biases the cleaning device against the perforated surface when in the second position to maintain constant engagement of the cleaning device against the perforated surface while the sieve is rotated.

2. The appliance of claim 1, further including:
a housing for holding the sieve;
a lid fitted over the housing and having a hollow food inlet tube; and
a pusher tube fitting within the food inlet tube;
wherein the pusher tube is configured to push food items into the perforated surface of the sieve.

3. The appliance of claim 1, the cleaning device further including a wiper blade.

4. The appliance of claim 3, further including the wiper blade is comprised of polytetrafluoroethylene.

5. The appliance of claim 1, wherein the second biasing member is a coil wave spring.

6. The appliance of claim 2, further including a recess for collecting liquid separated from the food item during extraction and a drain tube for draining liquid from the recess to a juice jug.

7. The appliance of claim 2, further including a container detachable from the housing for collecting solid particles after extraction.

8. The appliance of claim 1, further including a pushbutton connected to the cleaning device which is periodically depressed to remove unwanted buildup of pulp from the perforated surface of the sieve.

9. A juicing appliance, comprising:
a housing;
a sieve disposed within the housing having an inner perforated surface for extracting a food item into liquid and solid particles;
a source of rotatable power for rotating the sieve; and
a manually operated cleaning device for removing unwanted buildup of pulp from the perforated surface of the sieve, the cleaning device includes a wiper blade moveable between a first position normally biased by a spring assembly into a non-engaged position from the perforated surface and a second position when the cleaning device is operated to an engaged position against the perforated surface; and
the cleaning device further includes a biasing member to bias the wiper blade is against the perforated surface when in the second position wherein in the second position the biasing member maintains the wiper blade in a constant engagement against the perforated surface while the sieve is rotated.

10. The appliance of claim 9, further including:
a lid fitted over the housing and having a hollow food inlet tube; and
a pusher tube fitting within the food inlet tube;
wherein the pusher tube is configured to push food items into the perforated surface of the sieve.

11. The appliance of claim 9, further including the wiper blade is comprised of polytetrafluoroethylene.

12. The appliance of claim 9, wherein the biasing member is a coil wave spring.

13. The appliance of claim 9, further including a recess beneath the sieve for collecting liquid separated from the food item during extraction and a drain tube for draining liquid from the recess to a juice jug.

14. The appliance of claim 2, further including a container detachable from the housing for collecting solid food particles after extraction.

15. The appliance of claim 1, further including a pushbutton connected to the cleaning device which is periodically depressed to remove unwanted buildup of pulp from the perforated surface of the sieve.

16. A juicing appliance, comprising:
a housing;
a sieve disposed within the housing having an inner perforated surface for extracting a food item into liquid and solid particles:
a source of rotatable power for rotating the sieve; and
a cleaning device for removing unwanted buildup of pulp from the perforated surface of the sieve, the cleaning device is a wiper blade moveable between a first position and a second position by a spring assembly, where in the cleaning device is biased in the first position in a non-engaged position from the perforated surface and moveable into the second position;
wherein the cleaning device further include a biasing member which biases the wiper blades against the perforated surface when in the second position, the biasing member being a coil wave spring configured to maintain constant engagement of the wiper blade against the perforated surface while the sieve is rotated.

* * * * *